United States Patent
Kochsiek (12)

(10) Patent No.: US 6,550,140 B1
(45) Date of Patent: Apr. 22, 2003

(54) METHOD FOR FINISHING BALL CAGES MEANT FOR HOMOCINETIC JOINTS

(75) Inventor: Guido Kochsiek, Leopoldshöhe (DE)

(73) Assignee: IPROTEC Maschinen-und Edelstahlprodukte GmbH (DE)

( * ) Notice: Subject to any disclaimer, the term of this patent is extended or adjusted under 35 U.S.C. 154(b) by 0 days.

(21) Appl. No.: 09/555,914

(22) PCT Filed: Dec. 2, 1998

(86) PCT No.: PCT/EP98/07838

§ 371 (c)(1),
(2), (4) Date: Aug. 3, 2000

(87) PCT Pub. No.: WO99/30052

PCT Pub. Date: Jun. 17, 1999

(30) Foreign Application Priority Data

Dec. 6, 1997 (EP) .............................. 97121490

(51) Int. Cl.$^7$ ............................ B21D 53/12; B21K 1/05
(52) U.S. Cl. .................. 29/898.067; 29/557; 29/559; 82/1.11
(58) Field of Search ................. 29/898.067, 898.13, 29/557, 558; 82/120, 121, 129, 1.11

(56) References Cited

U.S. PATENT DOCUMENTS

| | | | |
|---|---|---|---|
| 3,707,753 A | * | 1/1973 | Bailey, Jr. |
| 3,726,162 A | * | 4/1973 | Sato |
| 4,575,362 A | | 3/1986 | Girguis |
| 4,593,444 A | * | 6/1986 | Kavthekar |
| 4,633,744 A | * | 1/1987 | Maurer |
| 4,656,789 A | * | 4/1987 | Schwar |
| 4,817,213 A | * | 4/1989 | Scobie |
| 5,163,009 A | * | 11/1992 | Yamane |
| 5,410,902 A | | 5/1995 | Jacob |
| 5,916,013 A | * | 6/1999 | Naumann et al. |
| 2001/0002369 A1 | * | 5/2001 | Kobayashi et al. |

FOREIGN PATENT DOCUMENTS

| | | | |
|---|---|---|---|
| DE | 38 42 190 | * | 6/1990 |
| DE | 40 34 516 A1 | | 5/1991 |
| DE | 40 34 517 A1 | | 5/1991 |
| DE | 42 12 238 A1 | | 10/1993 |
| DE | 42 12 238 | * | 10/1993 |
| EP | 0 128 870 A1 | | 12/1984 |
| JP | 56-89469 | * | 7/1981 |

OTHER PUBLICATIONS

Form–Dreh–Zentrum FDZ 100, pp. 14–19.
Josef Preis et al, Hartdrehen Statt Schleifen, Werkstatt und Betrieb 127 (1994), pp. 326–330.
D. Szepesi et al, Asymmetrische Werkstucke Mit Einem Schnellansprechenden Servosystem Drehen, Werkstatt Und Betrieb 123 (1990) pp. 396–400.
Rudolf Fingerle, Das Mehrkantdrehen– Grundlagen Und Problematik, Sonderdruck Aus "Der Maschinenmarkt" 67.JG. NR. 28 Vom 7. Apr. 1961, pp. 1–8.
Profilator pp. 1–3.

* cited by examiner

Primary Examiner—Gregory M. Vidovich
Assistant Examiner—Eric Compton
(74) Attorney, Agent, or Firm—Cantor Colburn LLP

(57) ABSTRACT

The invention relates to a process for the finishing of ball cages (1) destined for constant-velocity joints which are provided with spherical annular inner and outer bearing surfaces (3, 2) and ball pockets (4) for the accommodation of torque-transmitting balls. In order that the finishing of such ball cages (1) can be carried out rapidly, at low cost and in as fully automated a manner as possible it is proposed according to the invention that the finishing both of the inner and outer spherical annular bearing surfaces (3, 2) as well as the contact surfaces (5) of the ball pockets (4) located opposite one another in the axial direction and each for one ball ensues by means of lathe machining.

5 Claims, 4 Drawing Sheets

METHOD FOR FINISHING BALL CAGES MEANT FOR HOMOCINETIC JOINTS

TECHNICAL FIELD

The invention relates to a process for the finishing of ball-and-socket joints destined for constant-velocity joints which are provided with inner and outer bearing surfaces and ball pockets for the accommodation of torque-transmitting balls.

BACKGROUND OF THE INVENTION

In motor vehicles with front wheel drive the steered wheels are driven. For that reason front wheel axle shafts must have joints which permit both the spring deflection and rebound of the wheels as well as their steering deflection. In order to allow the most uniform possible drive of the wheels constant-velocity joints are used. In doing so homocinetic fixed joints constructed inter alia as cup-type joints are used for joints on front axle shafts while homocinetic displacement joints, which in addition to bending of the joint allow an axial displacement, also constructed as cup-type joints are used for joints on rear axle shafts.

These cup-type joints consist of a ball star placed on the axle shaft end on the wheel side on which the ball cage with balls and the ball cup connected to the wheel drive shaft are seated. In the case of the homocinetic fixed joint the ball cup and ball star have curved races on which the balls move. In the case of the homocinetic displacement joint the path of motion on the ball cup and ball star are of flat construction.

In the constant-velocity joints known in practice consisting of ball star, ball cage and ball cup, the ball cages provided with spherical inner and outer bearing surfaces and ball pockets for the accommodation of the torque-transmitting balls are first of all produced as blanks in a large number of forging, stamping and turning steps on various machines. Starting from these blanks the finishing of the ball cages ensues once again in a large number of work steps on various machines, the machine-cutting methods used being in particular grinding processes for machining the bearing surfaces and for machining the contact surfaces of the balls in the ball pockets. It is disadvantageous in this known finishing process that the final machining of each ball cage comprises several different working steps which have to be carried out on different machines. On account of the large number of working steps on different machines which cannot be carried out continuously in automatic manner the final machining of the ball cages is time-consuming and costly. Moreover, on account of the different clamping sizes errors occur so that tolerances are possible only within certain limits.

SUMMARY OF THE INVENTION

The underlying aim of the invention is to provide a method for the machine finishing of ball cages destined for constant-velocity joints which allows simple, low-cost and fully automated finishing of the ball cages which moreover ensues with increased precision.

The solution to this task is characterised according to the invention in that the production of both the inner and outer spherical annular bearing surfaces as well as the contact surfaces of the ball pockets located opposite one another in the axial direction and each for one ball ensues by means of lathe machining.

Due to the reduction according to the invention of the working steps necessary for machine finishing to lathe machining it is possible to carry out the finishing of ball cages rapidly, at low cost, with full automation and with increased precision. Due to the fact that the finishing of the ball cages by the method according to the invention requires only further lathe machining tasks on the blanks it is possible for all lathe machining tasks on a ball cage to ensue on the same lathe. By comparison with the known finishing operation in various working steps on different machines the finishing process according to the invention exhibits clear time, cost and precision advantages.

According to a practical embodiment of the invention it is proposed that first of all the inner spherical annular bearing surfaces, a contact surface on the end face and two annular, cylindrical clamping surfaces bounding the inner bearing surface are turned in one clamping step and that the ball cage machined in this way is rechucked by means of the cylindrical clamping surfaces and the contact surface on the end face. In order to permit continuous machining with rechucking of the workpiece only once, apart from the machine finishing of the inner spherical annular bearing surface in the first work step in an initial chucking of the workpiece there ensues the construction of various clamping surfaces which are needed so that in a succeeding chucking step the remaining surfaces can be machined in one lathe machining operation.

It is furthermore proposed according to the invention that after rechucking has taken place the outer spherical annular bearing surface and the contact surfaces constructed in the ball pockets each for one ball are machined by turning. Due to the rechucking of the partly machined ball cage which can ensue in fully automatic manner on the same lathe it is possible without any delay to do the machine finishing of the remaining surfaces in a further turning process. Thus overall it is evident that the entire finishing of a ball cage can ensue by means of lathe machining on the same lathe, it only being necessary for the machining of the different surfaces to construct in a first working step chucking surfaces which are necessary for holding the workpiece in the second turning step. Since on the one hand only lathe machining processes are used and on the other hand these can be carried out on the same machine it is possible to carry out the finishing according to the invention in fully automatic manner and hence rapidly and at low cost.

According to a preferred specific embodiment of the invention the machining of the two contact surfaces located opposite one another ensues simultaneously, i.e. during each insertion of the lathe tool into a ball pocket.

Finally, it is proposed according to a practical embodiment of the invention that the two contact surfaces located opposite one another are machined one after the other by feeding the lathe tool in the axial direction of the spindle axis of the workpiece. The turning method can be a hard turning method so that hardened workpieces can also be machined.

BRIEF DESCRIPTION OF THE DRAWINGS

Further characteristics and advantages of the invention emerge from the following description of the associated drawing in which a machining step of the finishing process according to the invention is schematically illustrated. The drawing shows.

DETAILED DESCRIPTION OF THE INVENTION

Figure 1:
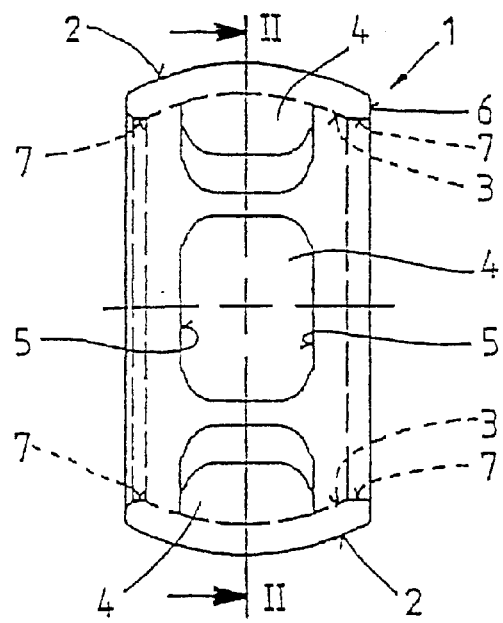
FIG. 1 is a side elevation of a machine-finished ball cage.

FIG. 1 shows a side elevation of a machine-finished ball cage 1. This ball cage 1 possesses a spherical annular outer bearing surface 2, a spherical annular inner bearing surface 3 as well as ball pockets for accommodating the torque-transmitting balls which are not illustrated.

Starting from a ball cage blank manufactured from a hollow tube the finishing of the ball cage 1 ensues exclusively by means of lathe machining processes which can be carried out on one and the same lathe. In order that these turning processes for machining the outer and inner bearing surfaces 2, 3 as well as for machining contact surfaces 5 of the ball pockets 4 each for one ball can be carried out on one machine the ball cage 1 must be rechucked once. However, this rechucking can ensue automatically so that viewed overall the finishing of the ball cage 1 ensues in fully automatic manner and, as it were, continuously.

The process for the finishing of the ball cage 1 ensues as follows.

In a first chucking step (as illustrated in boxes 20 and 21 of FIG. 3) the ball cage 1 to be machined is held in non-slipping manner from the outside in such a way that first of all the inner spherical annular bearing surface 3 can be turned. During this first lathe-turning step there ensues simultaneously the construction of a contact surface 6 at the end face as well as two cylindrical clamping surfaces 7 which bound the inner bearing surface 3. These cylindrical clamping surfaces 7 as well as the contact surface 6 at the end face serve for the reception or contact of clamping members which in the succeeding working steps allow the machining of the outer bearing surface 2 and the contact surfaces 5 in the ball pockets 4.

Figure 3:
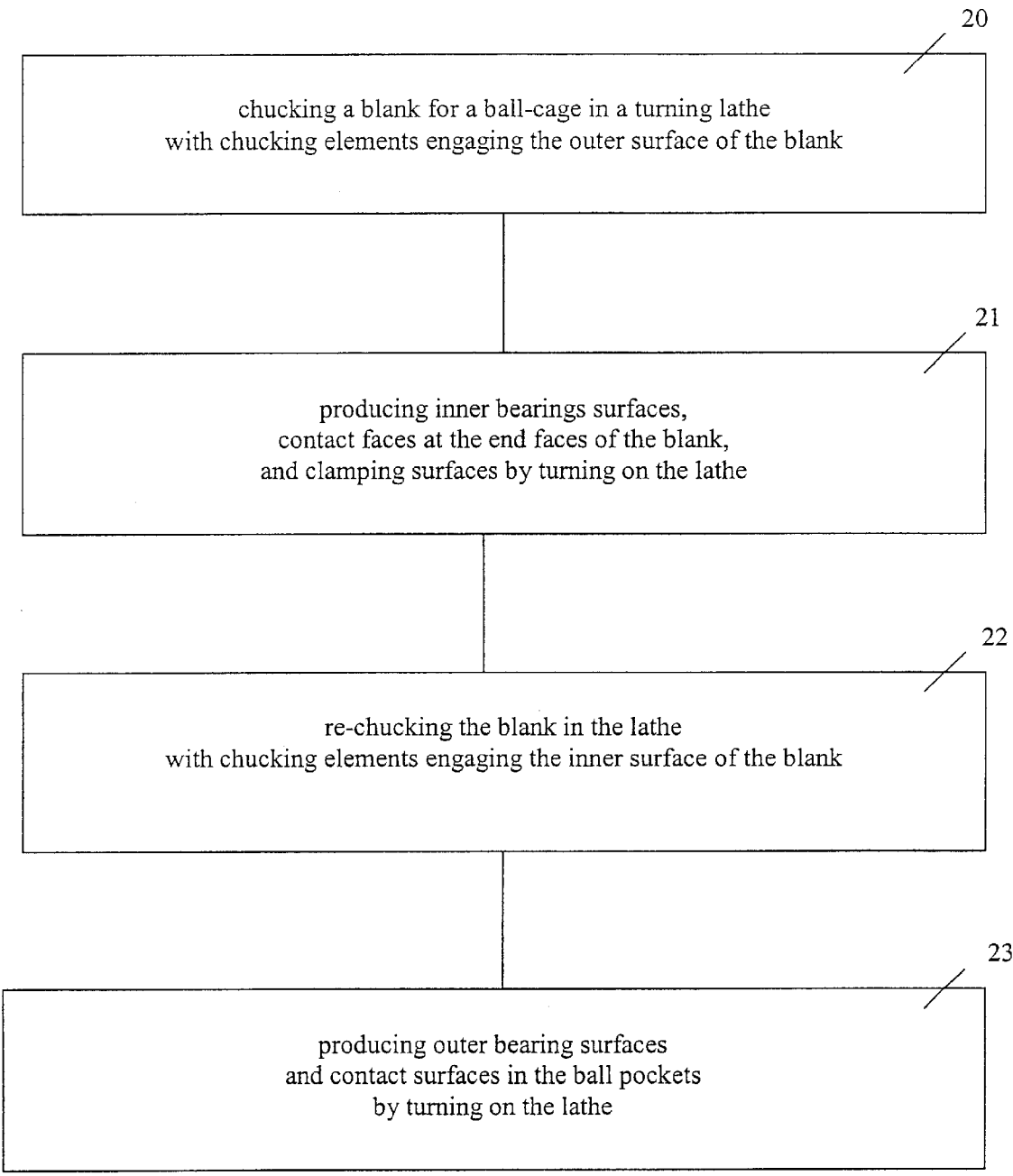
FIG. 3 is a diagrammatic representation outlining the steps for producing the machine-finished ball cage.
Figure 5:
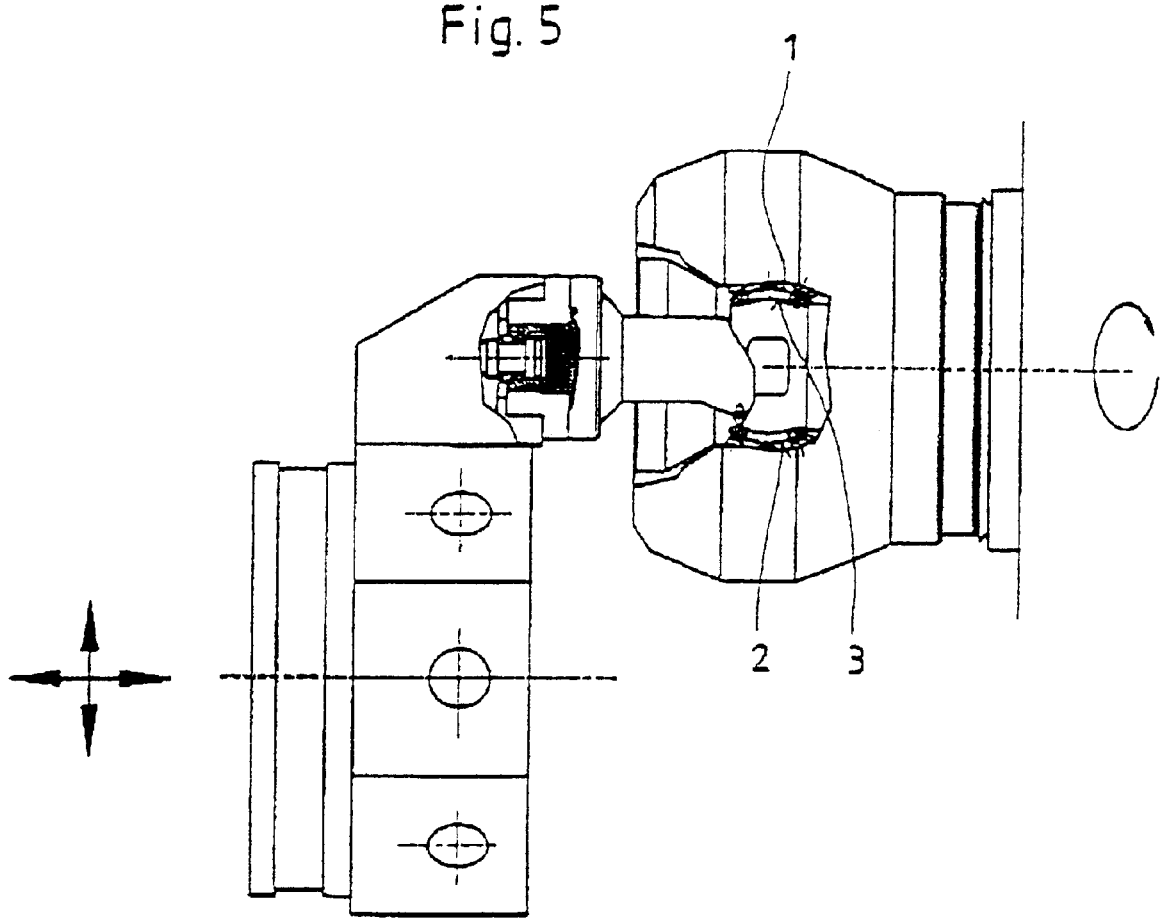
FIG. 5 is a schematic depicting the rechucking.

After the finishing of the inner surface 3 and the construction of the contact surface 6 at the end face as well as the clamping surfaces 7 rechucking of the ball cage 1 (as shown in FIG. 5) machined in this way ensues (as illustrated in boxes 22 and 23 in FIG. 3). In this rechucking the ball cage 1 is now held in non-slipping manner from the inside so that in the second lathe machining step the outer bearing surface 2 as well as the contact surfaces 5 located opposite one another in the ball pockets 4 in the axial direction of the ball cage 1 can be machined by turning.

Figure 2:
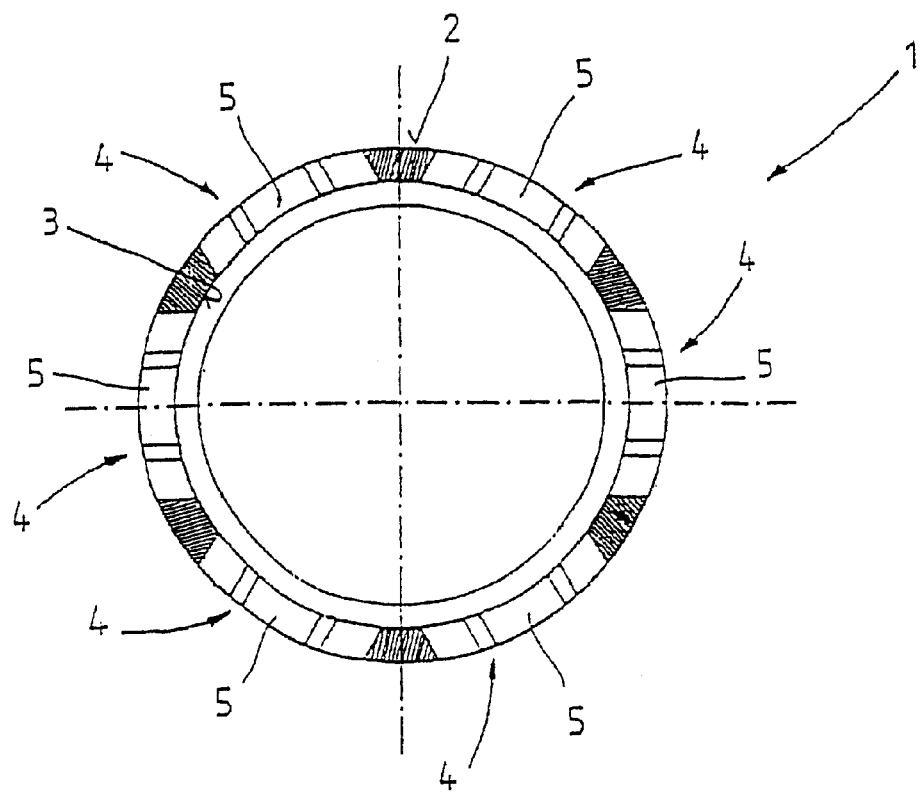
FIG. 2 is a longitudinal section along the cutting line II—II in FIG. 1.
Figure 4:
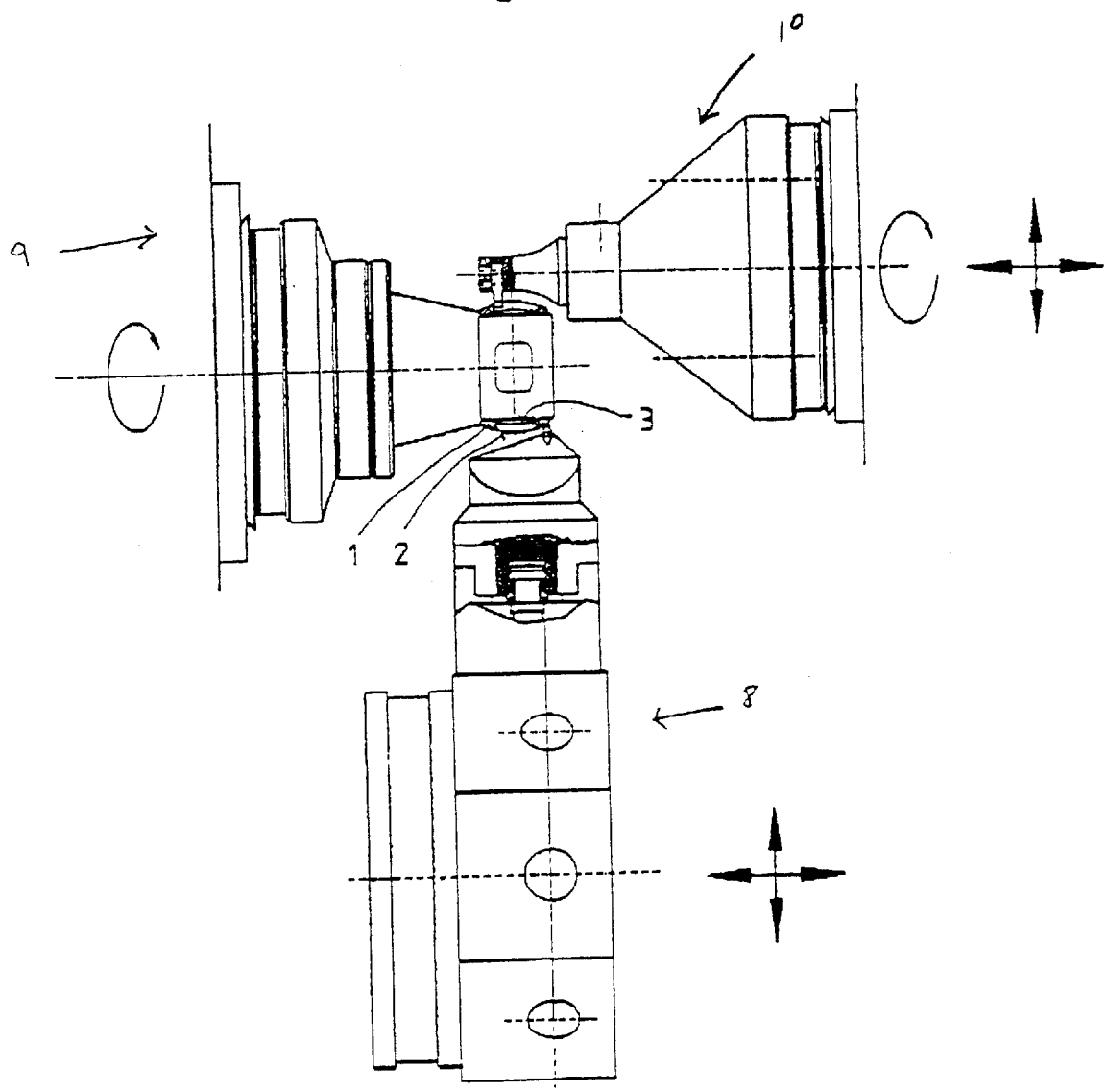
FIG. 4 is a schematic depicting the formation of the ball cage by means of a lathe and spindles.

FIG. 2 shows schematically a longitudinal section through a ball cage 1 during the lathe machining of the contact surfaces 5 in the ball pockets 4. The machining, as shown schematically in FIG. 4, of the contact surfaces 5 of the ball pockets 4 can ensue in that the lathe tool 8 is fastened to a tool spindle 9 in a manner offset parallel to the axis of the workpiece spindle 10, the two spindles 9, 10 being driven at a specified speed ratio with respect to one another. The feed motion of the lathe tool 8 for machine the contact surfaces 5 ensues by reducing the axial distance between the two spindles 9, 10. By synchronising the speeds of both spindles it is possible to guide the lathe tool 8 in such a way that the latter dips each time exactly into the ball pockets 4 and machining of the contact surfaces 5 ensues. In so doing, depending on the specific embodiment of the process, it is possible to machine by turning either only one contact surface 5 or both contact surfaces 5 of each ball pocket 4 simultaneously.

As is further evident from FIG. 2 it is possible to control the machining of the contact surfaces 5 of the ball pockets 4 in such a way that really only that part of the ball pockets 4 is machined as contact surfaces 5 for the balls on which a ball rests in the ball pockets 4.

Due to this optimisation of the machining to the necessary machining surfaces and the reduction of the finishing steps to lathe machining, it being possible for all lathe machining steps to be carried out on the same lathe it is possible with the process described previously to machine-finish ball cages 1 rapidly, at low cost and in fully automatic manner.

What is claimed is:

1. A process for the finishing of ball cages destined for constant-velocity joints which are provided with inner and outer bearing surfaces and ball pockets for the accommodation of torque-transmitting balls comprising:

turning the ball cage by lathe machining to form an inner spherical annular bearing surface, a contact surface at an end face of the ball cage, and two annular, cylindrical clamping surfaces bounding the inner spherical annular bearing surface;

rechucking the ball cage by means of the two annular, cylindrical clamping surfaces and the contact surface at the end face; and turning the ball cage by lathe machining to form an outer spherical annular bearing surface and contact surfaces in ball pockets, wherein the contact surfaces in the ball pockets are located opposite one another in the axial direction and each for one ball.

2. Process according to claim 1, wherein all lathe machining tasks on a ball cage ensue on the same lathe.

3. Process according to claim 4, wherein the two contact surfaces located opposite one another in each ball pocket are machined simultaneously.

4. Process according to claim 4, wherein the machining of the two contact surfaces of each ball pocket ensues one after the other by feeding the lathe tool in the axial direction of the workpiece spindle axis.

5. Process according to claim 1, wherein a hard turning process is used for the lathe machining.

* * * * *